United States Patent [19]

High et al.

[11] Patent Number: 5,331,559

[45] Date of Patent: Jul. 19, 1994

[54] APPARATUS FOR PREVENTING PROPELLER OVERSHOOT

[75] Inventors: Glen T. High; Larry C. Prevallet, both of Phoenix; Joseph W. Free, Mesa, all of Ariz.

[73] Assignee: AlliedSignal Inc., Morris Township, Morris County, N.J.

[21] Appl. No.: 762,756

[22] Filed: Sep. 18, 1991

[51] Int. Cl.⁵ .................... G06F 15/50; B64C 11/50
[52] U.S. Cl. .................... 364/431.02; 364/424.01; 416/34; 244/181
[58] Field of Search ............ 364/431.02, 424.01, 364/424.02, 431.01, 431.05; 416/27, 30, 35, 241, 123, 244, 34; 60/39.15; 244/195, 180

[56] References Cited

U.S. PATENT DOCUMENTS

| | | | |
|---|---|---|---|
| 3,575,529 | 4/1971 | Bierman | 416/27 |
| 3,930,366 | 1/1976 | Nelson | 60/39.15 |
| 3,963,372 | 6/1976 | McLain et al. | 416/30 |
| 3,969,890 | 7/1976 | Nelson | 60/39.15 |
| 4,185,460 | 1/1980 | Moore et al. | 60/224 |
| 4,276,744 | 7/1981 | Pisano | 60/39.161 |
| 4,611,289 | 9/1986 | Coppola | 364/492 |
| 4,928,241 | 5/1990 | Day | 364/424.01 |
| 4,934,825 | 6/1990 | Martin | 364/431.01 |
| 5,017,089 | 5/1991 | Schneider et al. | 416/35 |
| 5,023,793 | 6/1991 | Schneider et al. | 364/431.02 |
| 5,078,345 | 1/1992 | De Vries et al. | 364/431.02 |

FOREIGN PATENT DOCUMENTS

| | | |
|---|---|---|
| 0392967 | 10/1990 | European Pat. Off. |
| 2194357 | 3/1988 | United Kingdom |
| 2217477 | 10/1989 | United Kingdom |
| 2226430 | 6/1990 | United Kingdom |

OTHER PUBLICATIONS

PCT Search Report dated Jan. 15, 1993.

Primary Examiner—Thomas G. Black
Assistant Examiner—Tan Q. Nguyen
Attorney, Agent, or Firm—James W. McFarland; Robert A. Walsh

[57] ABSTRACT

To prevent propeller overshoot, a propeller governor control generates a signal which modifies a speed command issued to a propeller governor. The signal causes the propeller governor to change blade pitch before the propeller reaches its commanded speed. The propeller governor control also compensates for small calibration errors in the propeller governor.

16 Claims, 2 Drawing Sheets

APPARATUS FOR PREVENTING PROPELLER OVERSHOOT

FIELD OF THE INVENTION

The present invention relates in general to power management systems for turbine engines and in particular to a propeller governor control for turboprop engines.

BACKGROUND OF THE INVENTION

Historically, turboprop engines have been controlled via two levers in the cockpit. A speed lever adjusts engine power-turbine speed and a power lever controls engine power. The pilot would adjust the speed lever to obtain the desired engine speed setting. Then, the pilot "closes the loop" on torque by watching a gauge and moving the power lever angle to the desired torque level. Engine power-turbine speed increases until the desired speed is reached. As the power lever is advanced further, engine speed remains constant, but engine torque would be further increased.

Propeller shaft speed is controlled by a power-turbine speed governor. A torque motor on the governor allows for the adjustment of the propeller shaft speed. The speed lever sets the governor to a desired speed. As the power lever is adjusted, the governor adjusts the pitch of the blades to hold the engine at the desired speed. The governor regulates propeller blade pitch by controlling the pressure of oil supplied to a propeller speed. By increasing the pressure of oil supplied to the propeller dome, blade pitch is reduced; and by decreasing the pressure of oil supplied to the propeller dome, blade pitch is increased.

Among the problems associated with the governor control loops is propeller overshoot. When the engine is commanded to accelerate, much added energy is required to accelerate the propeller to the commanded speed. Once the power turbine reaches the commanded speed, the governor begins to change blade angle. Due to the proportional regulation action of the power turbine speed governor and the inertia of the propeller, however, the engine overshoots its commanded speed.

Therefore, it is an object of the present invention to prevent propeller overshoot.

SUMMARY OF THE INVENTION

Apparatus according to the present invention prevents propeller overshoot by modifying a speed command supplied to a propeller governor. The apparatus comprises delta speed means and modifying means. The delta speed means provides a delta speed signal indicating changes in propeller speed. When actuated by the delta speed means, the actuatable modifying means modifies the speed command such that the propeller governor begins to change blade pitch before the propeller speed reaches the commanded speed. The speed command is modified when the delta speed signal falls outside a steady-state initial condition range.

DETAILED DESCRIPTION OF THE PREFERRED EMBODIMENT

Figure 1:
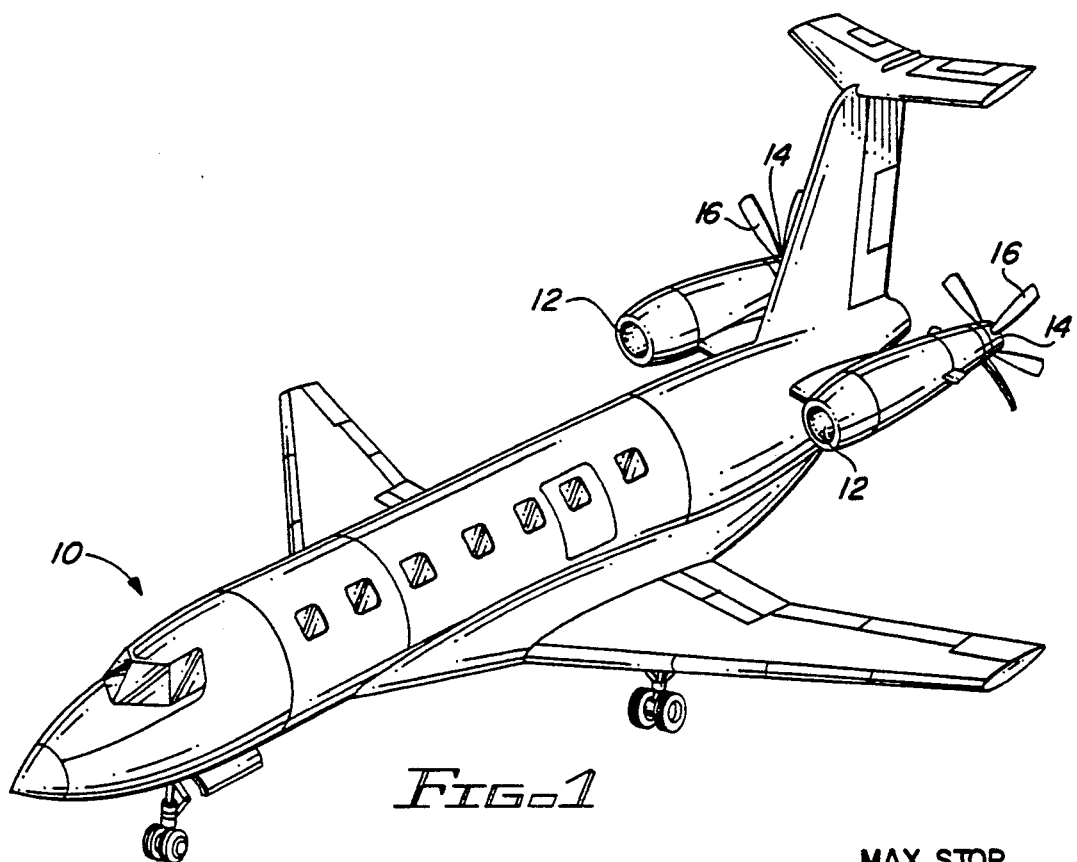
FIG. 1 is a pictorial view of an aircraft having twin turbo prop engines.

Referring to FIG. 1, there is shown an aircraft 10 having twin turbo prop engines 12. Each engine 12 has a turbine-type power plant that includes a compressor section (not shown), combustion section (not shown) and a turbine section (not shown). These sections are arranged in serial flow relation. A spinner 14 is connected to the aft end of each engine 12. A plurality of propeller blades 16 are circumferentially disposed about the spinner 14 and extend radially therefrom. Air that enters each engine 12 is compressed in the compressor section. The compressed air is discharged to the combustion section, where the air is mixed with fuel. The mixture is ignited to produce hot expanding gases that turn the turbine section, which, in turn, drives the propeller blades 16. The propeller blades 16 move a mass of cold air to create a thrust. The thrust produced by the propeller blades 16 is varied by changing blade pitch. The pitch is changed by rotating the blades 16 about their longitudinal axes.

In conventional power management systems, engine speed is controlled by a speed lever. However, in applicants' copending application Ser. No. 07/762,322 entitled "POWER MANAGEMENT SYSTEM FOR TURBINE ENGINES", speed is set by a plurality of flight mode buttons that correspond to various flight modes (e.g., takeoff, climb, cruise). In response to the flight mode buttons, this power management system issues speed commands to the propeller governor, which closes a speed loop to maintain engine speed at the commanded speed. Application Ser. No. 07/762,322, filed concurrently herewith, and now issued as U.S. Pat. No. 5,315,819, is incorporated herein by reference. For the purposes of this specification, however, a power management system refers to any system that issues speed commands to the propeller governor. Such systems include, but are not limited to, conventional power management systems and applicants' power management system of Ser. No. 07/762,322.

Figure 2:
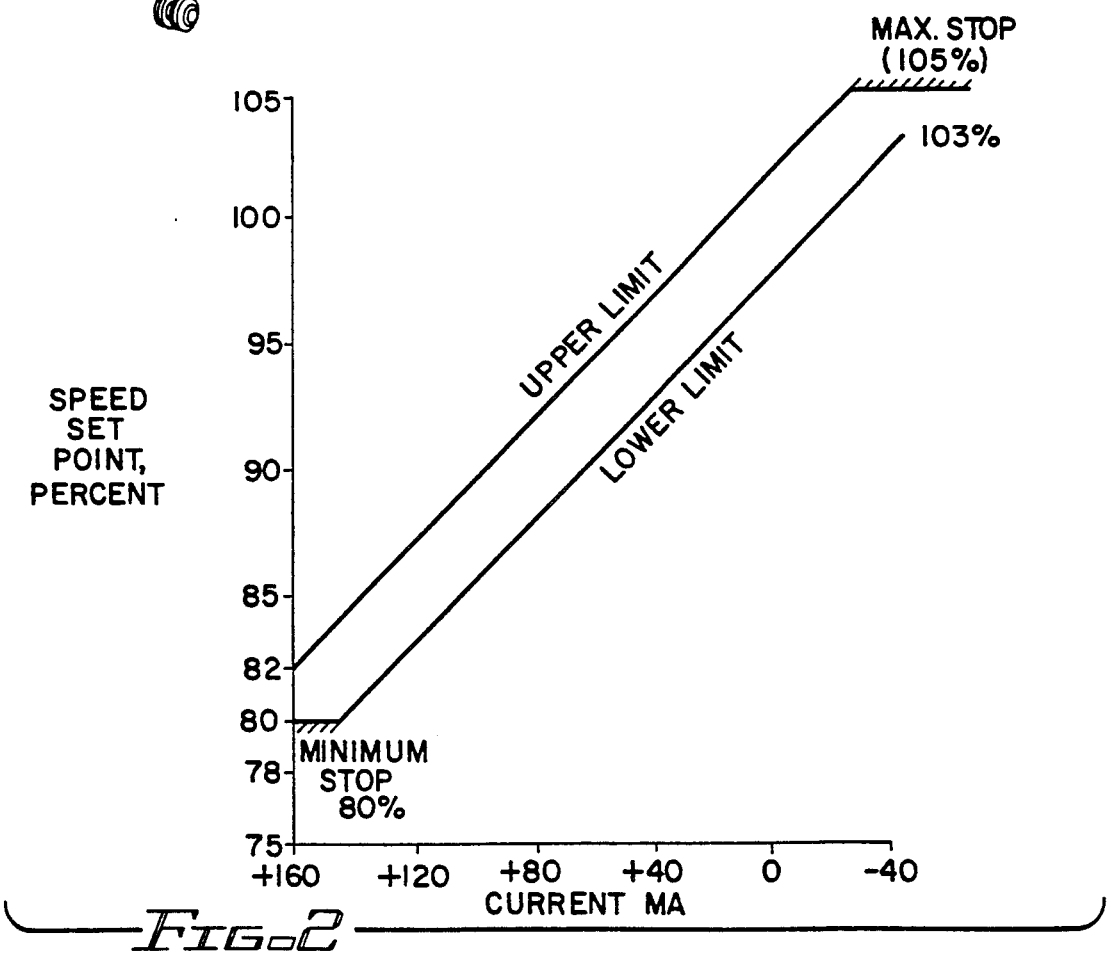
FIG. 2 is a graph of speed set point versus current for a propeller governor.

The power management system provides a current representing a speed command to a speed setpoint actuator (i.e., the torque motor) on the propeller governor. The speed command sets a target speed, which is expressed as a percentage of maximum rated engine speed. See, for example, the graph of FIG. 2, which shows speed set point versus input current. The speed setpoint actuator controls the position of a flyweight to establish a target speed for the propeller. The flyweight controls a spool valve, which regulates the flow of oil to the propeller dome.

Figure 3:
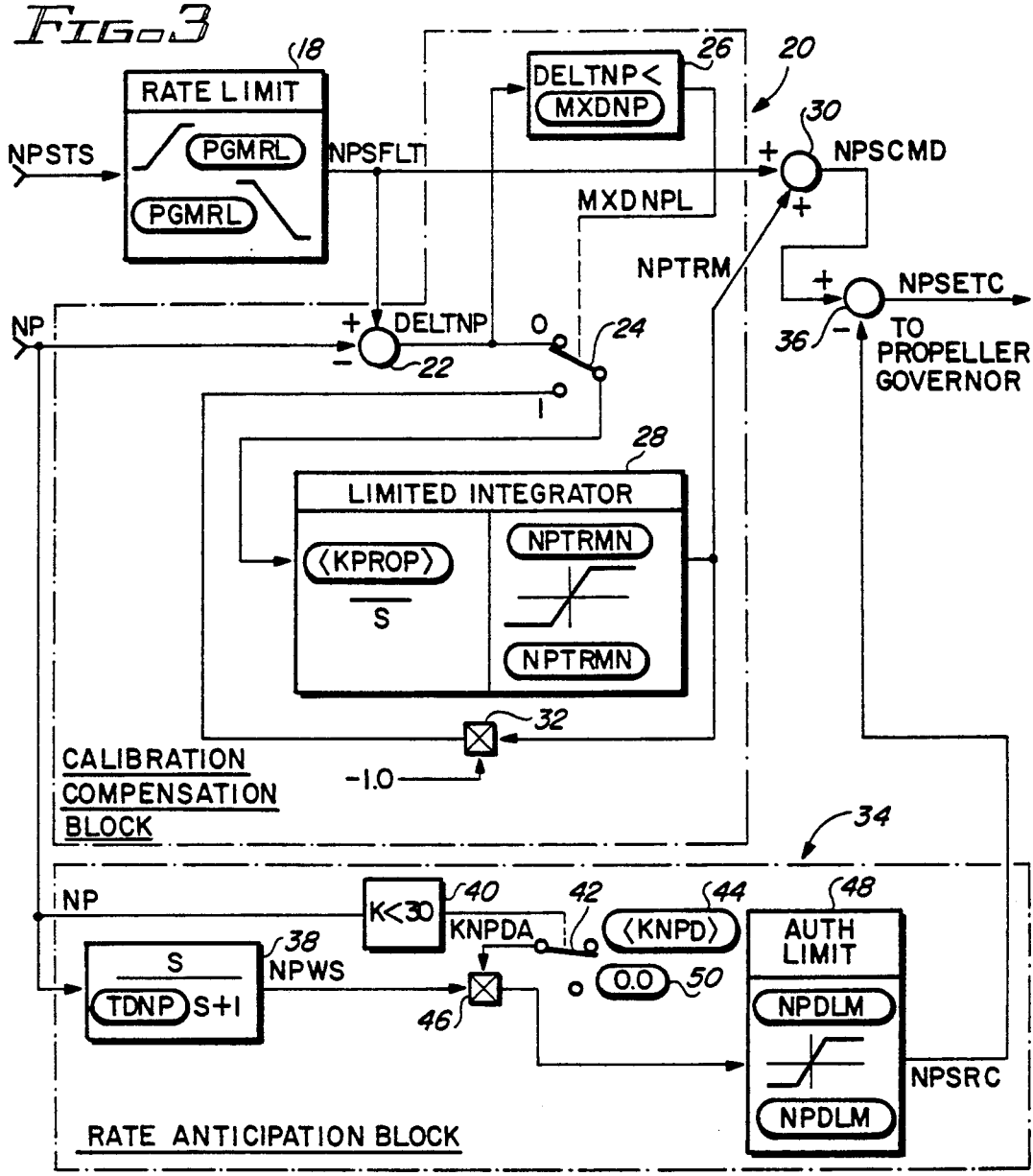
FIG. 3 is a block diagram of a propeller governor control according to the present invention.

Referring now to FIG. 3, the propeller governor control logic receives a speed command NPSTS from a power management system (not shown). The speed command NPSTS is supplied to a rate limiter 18, which limits the rate of change in the commanded speed to a value PGMRL allowing for a smooth transition in propeller speeds when the pilot changes speeds. The output of the rate limiter 18 provides the flight speed command NPSFLT.

The propeller governor logic includes a limited-authority trim integrator which functions as a calibration compensation block 20. There can be small errors in the calibration of a propeller governor on the order of 0.25%. These small errors are compensated for with adjusting the flight speed command NPSFLT by a compensation signal NPTRM in order to force the propeller governor to operate at the speed set by the flight speed command NPSFLT. A first subtracter 22 takes the difference of the flight speed command NPSFLT and a signal indicating measured propeller speed NP. The propeller speed NP is measured by such well known means as speed monopoles. An output of the first subtracter 22 provides a difference signal DELTNP. One output of the first subtracter 22 is coupled to pole 0 of a first switch 24, and another output is coupled to an input of a first block 26. The first block 26 compares the difference signal DELTNP to a limit MXDNP, such as two percent. Below this limit, the difference signal DELTNP is considered small; therefore, the first block 26 issues a signal MXDNPL that causes the first switch 24 to switch to pole 0, whereby the difference signal DELTNP is supplied to a limited integrator 28. In the limited integrator 28, the difference signal DELTNP is integrated over time, multiplied by a gain KPROP and limited to a value NPTRMN such as two percent. The output of the limited integrator 28 provides the steady-state component to compensate for propeller governor error, thus ensuring zero propeller speed error. This steady-state component is the calibration error. Thus, the limited integrator 28 behaves as a speed-error trim integrator. An output of the limited integrator 28 provides the compensation signal NPTRM, which is added to the flight speed command NPSFLT by an adder 30. The output of the adder 30 provides an adjusted speed command NPSCMD. Thus, the calibration compensation block 20 adjusts the flight speed command NPSFLT to compensate for small calibration errors that cause a difference between actual speed NP and the speed command NPSFLT.

The calibration compensation block 20 does not adjust the flight speed command NPSFLT for large transients. When the difference signal DELTNP exceeds the limit MXDNP, the output signal MXDNPL causes the first switch 24 to switch to pole 1. Pole 1 of the first switch 24 is coupled to an output of a first multiplier 32, which multiplies the compensation signal NPTRM, provided by the limited integrator 28, by a constant −1.0. Thus, when the first switch 24 is switched to pole 1, the signal -NPTRM is fed back into the input of the limited integrator 28. As a result, the output signal from the limited integrator 28 is driven to zero. Thus, for a large transient, the compensation signal NPTRM is set to zero.

The propeller governor control also includes a rate anticipation block 34, which prevents the engine 12 from overshooting its speed commanded by the adjusted speed command NPSCMD. The rate anticipation block 34 provides a rate anticipation signal NPRSC that causes the set point actuator of the propeller governor to be set to a "false" set point, i.e., premature set point. The rate anticipation signal NPSRC is subtracted from the adjusted speed command NPSCMD by a second subtracter 36. An output of the second subtracter 36 supplies the propeller setpoint speed command NPSETC to the speed set point actuator of the propeller governor. Once the measured propeller speed NP reaches the false set point, the propeller governor begins to change blade angle. Although the propeller speed overshoots the false set point, the overshoot is still below the speed commanded by the adjusted speed command NPSCMD. As the change in propeller speed is slowed, the rate anticipation signal NPRSC goes to zero, and the setpoint speed command NPSETC approached the adjusted speed command NPSCMD. Thus, the propeller is eased into the speed commanded by the adjusted speed command NPSCMD.

The rate anticipation signal NPSRC is calculated as a weighting factor KNPDA times the derivative NPWS of propeller speed with respect to time. The derivative NPWS is calculated from measured propeller speed NP by a differentiator 38. As the rate of change of propeller speed approaches zero, the derivative NPWS approaches zero. When measured propeller speed NP is greater than thirty percent, the weighting factor KNDPA is set equal to the signal KNDP. The signal KNPD is an apriori value that indicates the amount of the derivative NPWS that is allowed to affect propeller speed setpoint command NPSETC. For example, the signal KNPD can have the value of 0.5. Thus, when the measured speed NP is greater than thirty percent, a second block 40 provides an output that causes a second switch 42 to select the signal KNPD from a first memory location 44. A second multiplier 46 takes the product of the derivative NPWS and the signal KNPD. The product is limited by an authority limiter 48 to a value NPDLM, such as ±10 percent. An output of the authority limiter 48 provides the rate anticipation signal NPSRC. Thus, decreasing propeller speed drives the derivative NPWS to zero which, in turn, drives the rate anticipation signal NPSRC to zero.

When propeller speeds NP are below thirty percent, the rate anticipation block 34 is disabled. At such speeds, rate anticipation is unnecessary. For example, overshoot is not a concern during startup. When propeller speeds NP are below thirty percent, the second block 40 provides an output that causes the second switch 42 to select the value 0.0 from a second memory location 50. Thus, the second multiplier 46 multiplies the derivative NPWS by the value zero. As a result, the rate anticipation signal NPSRC is zero, and the setpoint speed command NPSETC is equal to the adjusted speed command NPSCMD.

When employed in a microprocessor-based power management system, the propeller governor control is most conveniently realized through software. Thus, the propeller governor control logic is programmed into the microprocessor. The step of programming can be readily accomplished by a person skilled in the art.

Alternatively, the propeller governor control can be realized by hardware. Adders, subtracters, multipliers, limiters, comparators, differentiators and filters (i.e., integrators) are well known to those skilled in the art.

Figure 4:
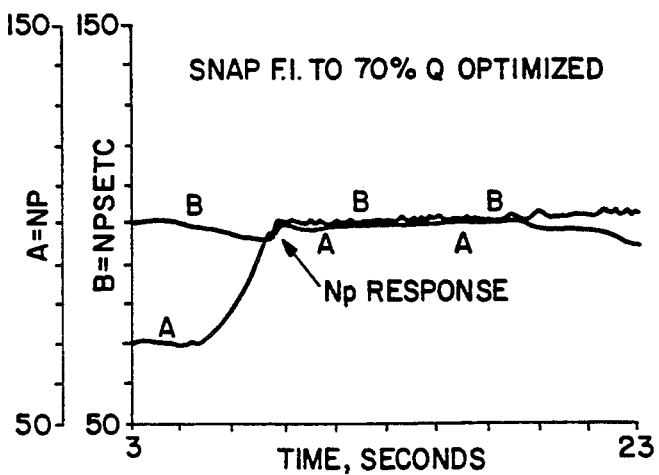
FIG. 4 is a graph of snap power level movement responses of propeller speed.

Referring now to FIG. 4, the response of propeller speed is plotted over time for a snap acceleration from flight idle to 70% torque. Measured propeller speed NP is indicated by curve A. Propeller setpoint speed NPSETC is indicated by curve B. Speeds NP and NPSETC are given as a percentage of maximum rated engine speed. Results for this plot were derived from engine tests and flight tests of a TPF351-20 free turbine engine, manufactured by Garrett Engine Division of Allied-Signal, Inc., the assignee of the present invention.

It will be understood that the embodiment described herein is merely exemplary and that a person skilled in the art may make many variations and modifications without departing from the spirit and scope of the invention. All such modifications are intended to be included within the scope of the invention as defined in the appended claims.

What is claimed is:

1. Apparatus for preventing propeller overshoot in a system that generates a speed command for setting a propeller governor to a desired speed and that receives a feedback signal indicating measured propeller speed, said apparatus comprising:

delta speed means, responsive to said feedback signal, for providing a delta speed signal indicating changes in said measured propeller speed; and modifying means, responsive to said delta speed signal and said feedback signal, for providing a modified speed command to said propeller governor for modifying said speed command such that said propeller governor changes blade pitch before said feedback signal indicates said desired speed to prevent propeller overshoot, said speed command being modified when said delta speed signal falls outside a first range.

2. Apparatus according to claim 1, wherein said first range is centered about the value zero.

3. Apparatus according to claim 1, wherein said modifying means includes anticipating means, responsive to said delta speed signal, for providing an anticipation signal that is proportional to said delta speed signal; and adding means for adding said anticipation signal to said speed command, an output of said adding means providing said modified speed command to said propeller governor.

4. Apparatus according to claim 3, wherein said anticipating means includes multiplying means for multiplying together said delta speed signal by a weighting signal, an output of said multiplying means providing said anticipation signal.

5. Apparatus according to claim 4, wherein said delta speed means includes a differentiator, which generates said delta speed signal as a derivative of said propeller speed with respect to time.

6. Apparatus according to claim 4, further comprising disabling means, responsive to said feedback signal, for disabling said anticipation means such that said speed command is not modified.

7. Apparatus according to claim 6, wherein said disabling means includes actuatable setting means for setting said weighting signal equal to zero, said setting means being actuated when said feedback signal indicates that propeller speed is below a predetermined value.

8. Apparatus according to claim 1, further comprising compensating means for compensating said modified speed command for bias in said propeller governor.

9. Apparatus according to claim 8, wherein said compensating means includes calculating means for calculating said bias of said propeller governor; and means, responsive to said calculating means, for removing said bias from said modified speed command.

10. Apparatus according to claim 9, wherein said calculating means includes filtering means for determining a steady-state component of said delta speed signal, whereby said bias is said steady-state component.

11. Apparatus according to claim 10, wherein said filtering means includes an integrator.

12. Apparatus according to claim 9, wherein said filtering means is actuatable, and wherein said apparatus further includes an actuating means, responsive to said delta speed means, for actuating said filtering means when said delta speed signal exceeds a second predetermined value.

13. Apparatus according to claim 1, wherein a microprocessor comprises said delta speed means and said modifying means.

14. Apparatus for modifying a speed command that sets a governor for a propeller to a desired speed, comprising:

delta speed means for providing a delta speed signal indicating changes in speed of said propeller;

anticipating means, responsive to said delta speed means, for providing an anticipation signal that is proportional to said delta speed signal; and modifying means for modifying said speed command with said anticipation signal such that said governor begins changing said propeller speed before said propeller speed reaches said desired speed, said modified speed command being supplied to said propeller governor.

15. A method of preventing propeller overshoot in a system including a propeller governor that begins to change propeller blade pitch when propeller speed reaches a desired speed, said method comprising the steps of:

generating a speed command which sets said propeller governor to said desired speed and modifying said speed command such that said propeller governor changes said blade pitch as said propeller speed approaches said desired speed.

16. A method according to claim 15, wherein said step of modifying said speed command includes the steps of:

determining changes in said propeller speed;

generating an anticipation signal that is proportional to said change in said propeller speed; and adding said anticipation signal to said speed command.

* * * * *